US008043464B2

(12) United States Patent
Kim et al.

(10) Patent No.: US 8,043,464 B2

(45) Date of Patent: Oct. 25, 2011

(54) SYSTEMS AND METHODS FOR ASSEMBLING LIGHTWEIGHT RF ANTENNA STRUCTURES

(75) Inventors: Hee Kyung Kim, El Segundo, CA (US); Fangchou Yang, Los Angeles, CA (US); Alberto F. Viscarra, Torrance, CA (US); Clifton Quan, Arcadia, CA (US); Derek Pruden, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 12/620,490

(22) Filed: Nov. 17, 2009

(65) Prior Publication Data

US 2011/0114242 A1 May 19, 2011

(51) Int. Cl.

| | |
|---|---|
| ***B32B 37/00*** | (2006.01) |
| ***B29C 65/00*** | (2006.01) |
| ***C09J 5/04*** | (2006.01) |
| ***H01Q 13/10*** | (2006.01) |

(52) U.S. Cl. ......... 156/292; 156/182; 156/314; 343/770

(58) Field of Classification Search .................... 156/60, 156/182, 196, 210, 212, 228, 292, 295, 314, 156/322; 343/705, 706, 707, 708, 746, 770, 343/853

See application file for complete search history.

(56) References Cited

U.S. PATENT DOCUMENTS

| | | | | |
|---|---|---|---|---|
| 3,004,229 | A | 10/1961 | Stearns | |
| 4,853,660 | A | 8/1989 | Schloemann | |
| 5,262,590 | A * | 11/1993 | Lia | 174/36 |
| 5,408,240 | A | 4/1995 | Battista et al. | |
| 5,633,615 | A | 5/1997 | Quan | |
| 6,018,326 | A | 1/2000 | Rudisill | |
| 6,366,185 | B1 | 4/2002 | Keesey et al. | |
| 6,696,163 | B2 | 2/2004 | Yang | |
| 6,871,396 | B2 | 3/2005 | Sugaya et al. | |
| 6,992,629 | B2 | 1/2006 | Kerner et al. | |
| 7,298,331 | B2 | 11/2007 | Oberly | |
| 7,523,548 | B2 | 4/2009 | Kataoka et al. | |
| 7,525,498 | B2 | 4/2009 | Quan et al. | |
| 2005/0264448 | A1 * | 12/2005 | Cox et al. | 343/700 MS |
| 2006/0097945 | A1 * | 5/2006 | McCarville et al. | 343/795 |

(Continued)

FOREIGN PATENT DOCUMENTS

EP 2 230 775 A2 9/2010

(Continued)

OTHER PUBLICATIONS

Extended European Search Report for European Application No. 10251312.4, filed Jul. 23, 2010, Extended European Search Report dated Nov. 23, 2010 and mailed Dec. 10, 2010 (6 pgs.).

(Continued)

*Primary Examiner* — Philip Tucker
*Assistant Examiner* — Brian R Slawski
(74) *Attorney, Agent, or Firm* — Christie, Parker & Hale, LLP

(57) ABSTRACT

Systems and methods for assembling lightweight RF antenna structures are provided. In one embodiment, the invention relates to a process for forming a lightweight antenna including a process for forming a first feed assembly for the antenna, the process for forming the first feed assembly including providing a flat flexible circuit substrate, providing a formed flexible circuit substrate, applying an adhesive to a plurality of locations on a surface of the flat substrate or the formed substrate, joining the flat substrate and the formed substrate using the adhesive, and heating the joined flat substrate and the formed substrate to bond the substrates.

24 Claims, 12 Drawing Sheets

U.S. PATENT DOCUMENTS

| | | | | |
|---|---|---|---|---|
| 2007/0025044 | A1* | 2/2007 | Golubovic et al. | 361/124 |
| 2007/0131451 | A1* | 6/2007 | Schmachtenberg et al. | 174/260 |
| 2007/0139275 | A1* | 6/2007 | Deaett et al. | 343/700 MS |
| 2008/0088519 | A1* | 4/2008 | Quan et al. | 343/770 |
| 2009/0165296 | A1 | 7/2009 | Carmi | |
| 2009/0231226 | A1 | 9/2009 | Quan et al. | |
| 2011/0113618 | A1 | 5/2011 | Viscarra et al. | |
| 2011/0113619 | A1 | 5/2011 | Viscarra et al. | |
| 2011/0115578 | A1 | 5/2011 | Quan et al. | |

FOREIGN PATENT DOCUMENTS

| | | | |
|---|---|---|---|
| EP | 2 288 242 | A1 | 2/2011 |
| FR | 2 871 336 | A1 | 12/2005 |
| GB | 2 064 233 | A | 6/1981 |
| JP | 8 051279 | A | 2/1996 |
| JP | 9 281520 | A | 10/1997 |
| WO | WO 2008/045349 | A1 | 4/2008 |

OTHER PUBLICATIONS

Extended European Search Report for European Application No. 10251577.2, filed Sep. 10, 2010, Extended European Search Report dated Feb. 24, 2011 and mailed Mar. 4, 2011 (5 pgs.).

Extended European Search Report for European Application No. 10251576.4, filed Sep. 10, 2010, Extended European Search Report dated Feb. 24, 2011 and mailed Mar. 4, 2011 (6 pgs.).

Office Action mailed Jun. 8, 2011 for U.S. Appl. No. 12/620,544, filed Nov. 17, 2009, Inventor Alberto F. Viscarra, et al. (14 pgs.).

Office Action mailed May 16, 2011 for U.S. Appl. No. 12/620,562, filed Nov. 17, 2009, Inventor Alberto F. Viscarra, et al. (11 pgs.).

Extended search report for European Application No. 10251575.6-1248, Raytheon Company, European extended search report dated Jun. 8, 2011 and mailed Jun. 16, 2011 (8 pgs.).

* cited by examiner

29

80
84
82
86

80
82

82

80
88

SYSTEMS AND METHODS FOR ASSEMBLING LIGHTWEIGHT RF ANTENNA STRUCTURES

STATEMENT REGARDING FEDERALLY SPONSORED RESEARCH

This invention disclosure is related to Government contract number FA8750-06-C-0048 awarded by the U.S. Air Force. The U.S. Government has certain rights in this invention.

BACKGROUND

The present invention relates generally to systems and methods for assembling lightweight RF antenna structures. More specifically, the invention relates to systems and methods for assembling lightweight feed assemblies of an RF antenna structure.

Next generation large area multifunction active arrays for applications such as space and airborne based antennas need to be lighter weight, lower cost and more conformal than what can be achieved with current active array architecture and multilayer active panel array development. These space and airborne antennas can be used for radar and communication systems, including platforms such as micro-satellites and stratospheric airships.

To address the need for lower cost and lightweight antennas, lightweight materials can be used to form antenna component structures. However, such lightweight materials can present new challenges for assembling antenna structures capable of providing sufficient performance in radar and communication systems.

SUMMARY OF THE INVENTION

Aspects of the invention relate to systems and methods for assembling lightweight RF antenna structures. In one embodiment, the invention relates to a process for forming a lightweight antenna including a process for forming a first feed assembly for the antenna, the process for forming the first feed assembly including providing a flat flexible circuit substrate, providing a formed flexible circuit substrate, applying an adhesive to a plurality of locations on a surface of the flat substrate or the formed substrate, joining the flat substrate and the formed substrate using the adhesive, and heating the joined flat substrate and the formed substrate to bond the substrates.

In another embodiment, the invention relates to a process for forming a bond between feeds of a lightweight antenna, the process comprising applying a first adhesive to a surface of a first feed assembly at a plurality of locations, heating the surface of the first feed assembly, wherein the heated first adhesive forms a plurality of spacers, applying a second adhesive to the surface of the first feed assembly, joining the first feed assembly and a second feed assembly using the second adhesive, and heating the joined first feed assembly and the second feed assembly to bond the assemblies.

BRIEF DESCRIPTION OF THE DRAWINGS

FIG. 5*a* is a side view of a precisely formed flexible circuit substrate in accordance with the assembly process for a level one RF feed.

FIG. 5*b* is a side view of the precisely formed flexible circuit substrate of FIG. 5*a* inserted into a jig.

FIG. 5*c* is a side view of the precisely formed flexible circuit substrate of FIG. 5*a* receiving adhesive from a dispensing machine.

FIG. 5*d* is a side view of a flat flexible circuit substrate being applied to the precisely formed flexible circuit substrate of FIG. 5*a* to form the L1 feed.

FIG. 5*e* is a side view of the L1 feed of FIG. 5*d* in a curing process.

FIG. 5*f* is a side view of the completed L1 feed of FIG. 5*e* after it is removed from the jig.

FIG. 6*a* is a side view of a flat flexible circuit substrate receiving both non-conductive adhesive and conductive adhesive from a dispensing machine in accordance with one embodiment of the invention.

FIG. 6*b* is a side view of the flat flexible circuit substrate of FIG. 6*a* flipped over for application to a formed flexible circuit substrate in a mold in accordance with one embodiment of the invention.

FIG. 6*c* is a side view of the flat flexible circuit substrate and the formed flexible circuit substrate in a curing process in accordance with one embodiment of the invention.

FIG. 6*d* is a side view of the assembled two layer structure of FIG. 6*c* receiving additional non-conductive adhesive from the dispensing machine.

FIG. 6*e* is a side view of the assembled two layer structure of FIG. 6*d* receiving additional conductive adhesive from the dispensing machine.

FIG. 6*f* is a side view of a second formed flexible circuit substrate in a mold applied to the assembled two layer structure of FIG. 6*e*.

FIG. 6*g* is a side view of the second fowled flexible circuit substrate and the assembled two layer structure of FIG. 6*f* in a second curing process, thereby forming a completed L2 feed assembly in accordance with one embodiment of the invention.

FIG. 7*a* is a side view of a level two RF feed receiving non-conductive Epibond adhesive via a screen printed pattern in accordance with one embodiment of the invention.

FIG. 7*b* is a side view of the level two RF feed of FIG. 7*a* after the screen printed pattern layer or stencil has been removed leaving the Epibond adhesive at preselected areas along the L2 feed.

FIG. 7*bi* is an enlarged perspective view of a washer shaped spacer formed from the cured Epibond adhesive on the level two RF feed of FIG. 7*b*.

FIG. 7*c* is a side view of the level two RF feed of FIG. 7*b* in a curing process, where the cured Epibond adhesive forms the spacers on a top formed layer of the level two RF feed.

FIG. 7*d* is a side view of the level two RF feed of FIG. 7*c* receiving non-conductive adhesive along the top formed layer of the level two RF feed from the dispensing machine.

FIG. 7*e* is a side view of the level two RF feed of FIG. 7*d* receiving conductive adhesive along the top formed layer of the level two RF feed from the dispensing machine.

FIG. 7*f* is a side view of a level one RF feed being aligned with the level two RF feed of FIG. 7*e* and the spacers thereon in preparation for joining.

FIG. 7*g* is a side view of the level one RF feed of FIG. 7*f* joined with the level two RF feed of FIG. 7*f* using pressure applied by multiple bars placed within the long slot radiators of the level one RF feed.

FIG. 7*h* is a side view of the bonded level one RF feed and level two RF feed of FIG. 7*g* in a curing process.

FIG. 7*i* is a side view of the completed RF antenna structure in accordance with one embodiment of the invention.

DETAILED DESCRIPTION OF THE INVENTION

Figure 1:
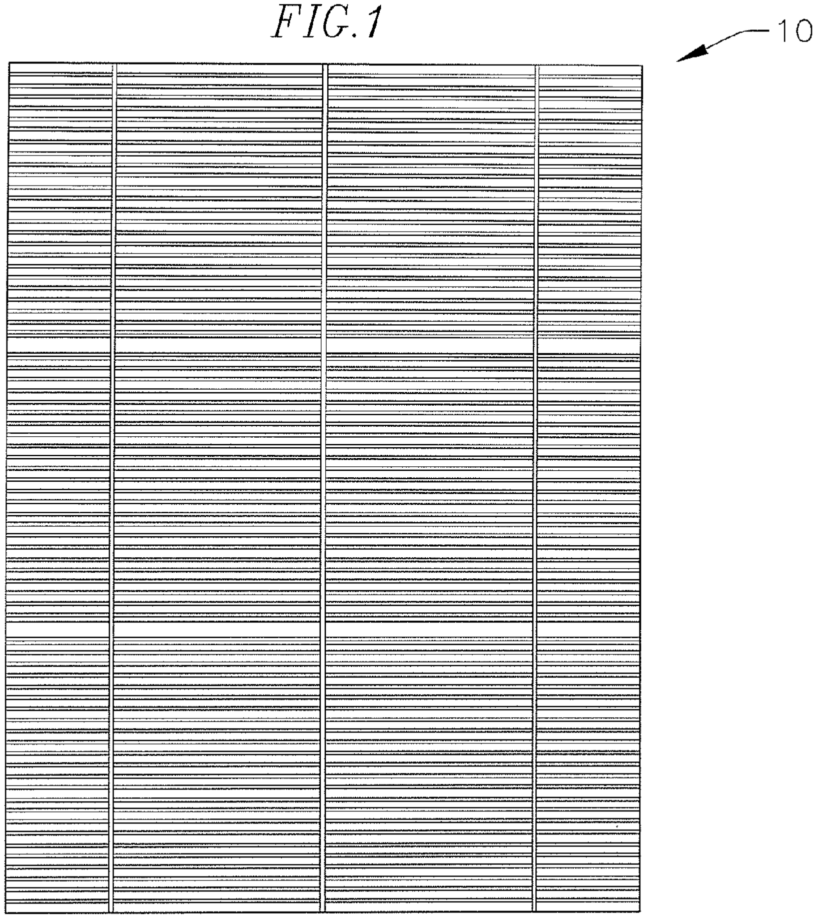
FIG. 1 is a top view of an RF antenna structure constructed of lightweight materials in accordance with one embodiment of the invention.

Thin flex circuit technologies can be used to build a thin ultra lightweight structural conformal antenna that can meet and surpass the challenging weight requirements for airship and space platforms. Applying three dimensional (3-D) circuitry on a folded/formed RF flex layer is a key enabler to bringing integrations of both electrical and mechanical functions to new heights. This can result in up to a 75% reduction in weight and in the number of dielectric, conductor, and adhesive layers. These methods integrate the microwave transmission line and components, control signal, and DC power manifold into multilayer 3-D fluted flex circuit board assemblies that are lighter weight and more rigid than can be done with conventional technology. This is accomplished with unique and innovative pleaded folding of alternating flex layers to effectively increase the area to route the RF, signal, and power lines onto a single layer without increasing the PCB panel area and minimizing the number of vias and traces within the RF flex circuitry.

To form the lightweight antenna, both a level one (L1) RF feed and a level two (L2) RF feed can be used. Each RF feed can include a formed or folded flexible circuit layer and a flat flexible circuit layer. Each of the folded layers can be formed using innovative processes. Once the components or layers of the L1 and L2 RF feeds have been fowled, then a process for assembling the RF feeds and ultimately the entire antenna structure can be performed.

Referring now to the drawings, embodiments of processes for assembling lightweight RF antenna structures are illustrated. These processes include processes for assembling the level one (L1) feed assemblies, the level two (L2) feed assemblies, and for bonding the L1 and L2 feeds. The feed assembly processes can include providing a flat flexible circuit substrate and a formed flexible circuit substrate, applying an adhesive to a plurality of locations on a surface of the flat substrate and/or the formed substrate and then joining the flat substrate and the formed substrate using the adhesive. The feed assembly processes can further include heating the joined flat substrate and the formed substrate to bond the substrates. In some embodiments, the adhesive can include both non-conductive adhesive and conductive adhesive dispensed at different locations. The feed assembly process can provide for assembly of an L1 feed.

In several embodiments, the feed assembly processes can further include applying a second adhesive to an opposing surface of the flat substrate, joining the flat substrate and a second formed substrate using the second adhesive, and heating the joined flat substrate, the formed substrate, and second formed substrate to bond the substrates. In such case, the additional actions of the process can provide for assembly of an L2 feed.

Once the L1 and L2 feeds have been assembled, another process can be used to bond the feeds. In a number of embodiments, the process for bonding the L1 and L2 feeds includes applying a first adhesive to a surface of the L2 feed at a plurality of locations and heating the surface of the L2 feed, where the heated first adhesive forms a plurality of spacers. The spacers can provide a precise separation between the feeds for ideal RF performance.

The process for bonding the L1 and L2 feeds can further include applying a second adhesive to the spacers, joining the L1 and L2 feeds using the second adhesive, and then heating the joined L1 and L2 feeds to bond the feeds. In several embodiments, the second adhesive can include both non-conductive adhesive and conductive adhesive dispensed at different locations.

In several embodiments, the flexible circuit substrates for the L1 and L2 feeds are made of a lightweight material such as a liquid crystal polymer (LCP) material. In a number of embodiments, the flexible substrates have copper cladding on one or both surfaces of the substrate and copper circuitry etched on those surfaces.

In many embodiments, other related processes are performed to fabricate the L1 and L2 feeds, to electrically interconnect them, and to route signals along transmission lines disposed on the feeds.

The level one (L1) RF feed for the RF antenna structure can be fabricated using specialized processes for shaping flexible circuit substrates. The fabrication process is described in a co-pending U.S. patent application, entitled "Process for Fabricating An Origami Formed Antenna Radiating Structure", the entire content of which is expressly incorporated herein by reference.

The level two (L2) RF assembly for the RF antenna structure can be fabricated using other specialized processes for shaping flexible circuit substrates. A process for fabricating a level two RF assembly for an RF antenna structure is described in co-pending U.S. patent application, entitled "Process for Fabricating A Three Dimensional Molded Feed Structure", the entire content of which is expressly incorporated herein by reference.

In order to deliver RF signals to active elements of a radiating long slot aperture of an L1 feed, an RF matched interconnect can be made between the radiating slot structure and the L2 RF feed. In the case of a lightweight antenna, the interconnect is preferably electrically sound as well as structurally sound. A process for electrically and physically interconnecting L1 and L2 feeds is described in co-pending U.S. patent application, entitled "Multi-Layer Microwave Corrugated Printed Circuit Board and Method", U.S. patent application Ser. No. 12/534,077, the entire content of which is expressly incorporated herein by reference.

As these next generation lightweight antennas are designed from flexible substrates, new challenges for the transmission lines used on those substrates are presented. The transmission lines provide pathways for RF signals used in conjunction with the antennas. There are several types of transmission lines and each type of RF transmission line has advantages based on the structure of the antenna/substrate at a given point. As the structure of the L1 and L2 feeds vary at different locations on the antenna, a transition from one type of transmission line to another can be very useful. An RF transition for an RF structure such as an L2 feed is described in co-pending U.S. patent application, entitled "RF Transition With 3-Dimensional Molded RF Structure", the entire content of which is expressly incorporated herein by reference.

FIG. 1 is a top view of an RF antenna structure 10 constructed of lightweight materials in accordance with one embodiment of the invention. The RF antenna structure can act as or be a component of an antenna used in an active array radar system. In other embodiments, it may be used in other radar or communication systems.

Figure 2:
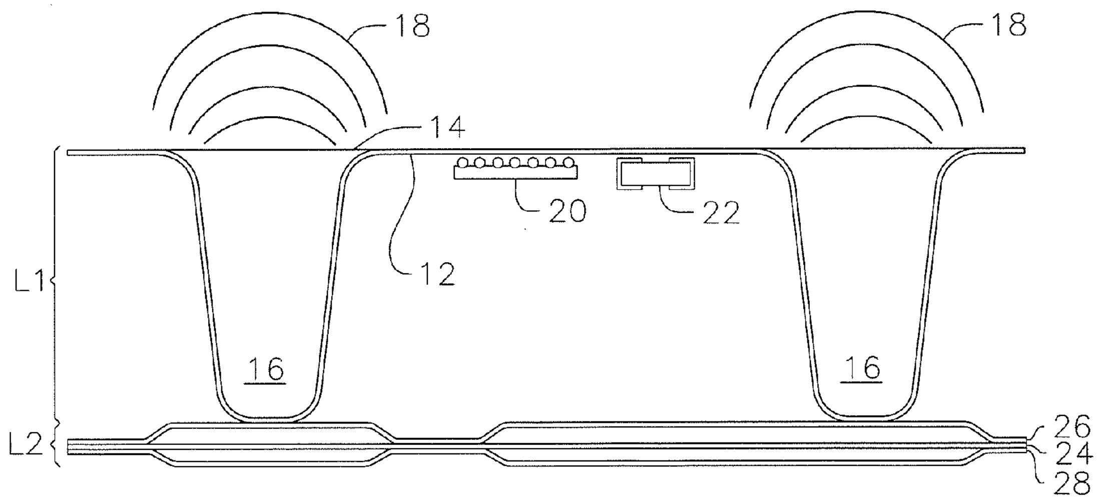
FIG. 2 is a cross sectional view of a portion of the RF antenna structure of FIG. 1 illustrating a level one RF feed assembly mounted to a level two RF feed assembly in accordance with one embodiment of the invention.

FIG. 2 is a cross sectional view of a portion of the RF antenna structure of FIG. 1 illustrating a level one (L1) RF feed assembly bonded to a level two (L2) RF feed assembly in accordance with one embodiment of the invention. The L1 assembly includes a folded flexible circuit layer 12 and a flat flexible circuit layer 14 where the folded areas of flexible layer 12 form elongated channels, or long slot radiators, 16 that radiate RF signals 18. Electrical components such as transmit/receive (T/R) chips 20 and capacitors 22 are mounted to a surface of the folded flex circuit layer 12. In a number of embodiments, the flexible circuit layers are formed of an LCP material.

The L2 feed "sandwich" assembly is mounted below the L1 feed assembly. The L2 feed assembly consists of three layers of LCP; a flat center layer 24, and molded/formed top 26 and bottom covers 28. The RF signals in the structure can support a suspended air-stripline transmission line design. In such case, the RF signals can travel within a cavity made by the top cover 26 and the bottom cover 28. The center layer 24 provides the RF signal trace routing. The top and bottom covers are plated on the inside of the cavity, providing the RF ground for the airline. As the topology of the 3-D antenna assembly varies across the assembly, use of different types of transmission lines on different sections of the assembly can maximize antenna performance. Therefore, transitions from one type of transmission line to another are useful for the three dimensional antenna structure. A description of an RF transition that can be used in conjunction with the L2 feed assembly is described in a co-pending U.S. patent application, entitled, "RF Transition with 3-Dimensional Molded Structure", as referenced above, the entire content of which is incorporated herein by reference.

On the outside of the top and bottom covers of the L2 assembly, digital control signals and power distribution lines can be routed. The traces and plating on the layers can be copper. However, in order to meet more strict weight requirements, the plating can also be replaced with aluminum. Similar traces and plating materials can be used for the L1 feed assembly.

The L1 feed assembly is bonded to the L2 feed assembly, and together they form the RF antenna array structure. In one embodiment, the L1 feed is approximately 7.8 mm tall, the L2 feed is approximately 1.4 mm tall, and therefore the entire assembly is approximately 9.2 mm tall (not including support electronics placed on the L2 assembly or any mounting standoffs). Each array panel of the RF antenna can be approximately 0.945 m by 1.289 m, or an area of 1.218 $m^2$. In several embodiments, each panel is electrically and mechanically independent from other panels. In other embodiments, the feeds and panels can have other suitable dimensions.

Support electronics for an active array antenna, such as the beam steering computer (BSC) and the power control modules (PCMs) can be attached to the back side of the L2 feed assembly. Communication in and out of the panels can be provided by a pair of fiber optic cables. The fiber cables enable communication with electronics located off the antenna structure, and the opto-electronics mounted on the backside of the Level 2 feed.

Figure 3:
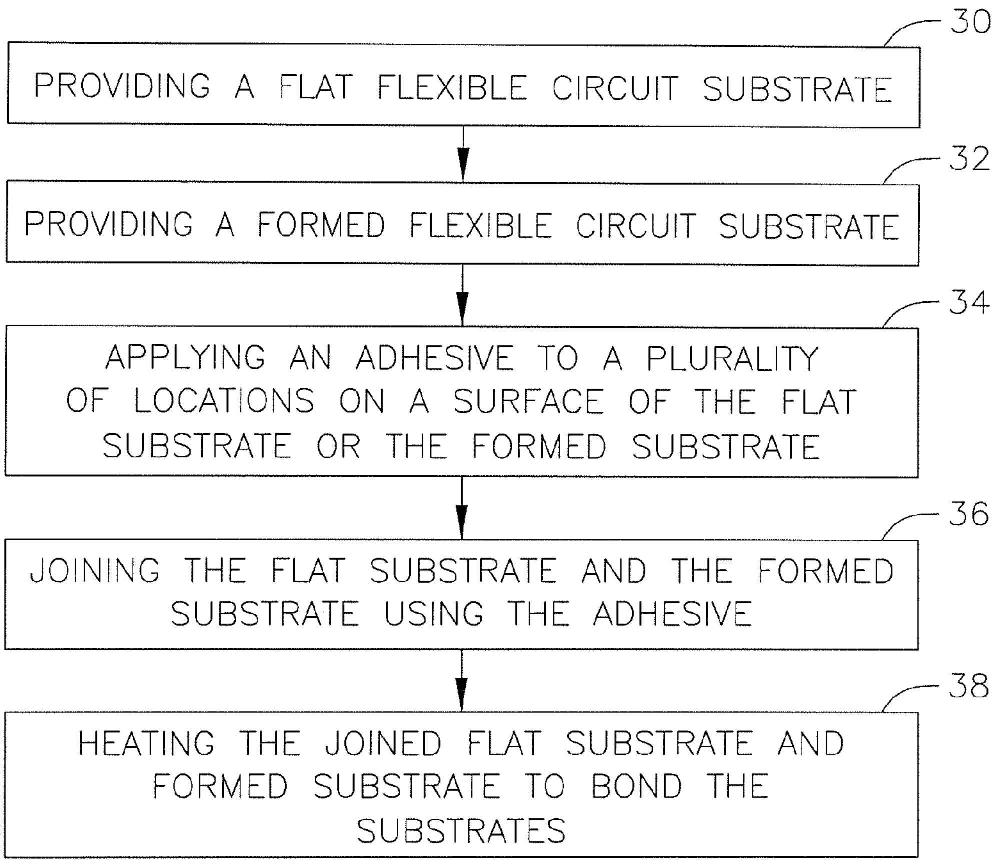
FIG. 3 is a flow chart of a process for assembling an RF feed assembly for a lightweight antenna in accordance with one embodiment of the invention.

FIG. 3 is a flow chart of a process 29 for assembling an RF feed assembly for a lightweight antenna in accordance with one embodiment of the invention. In one embodiment, the process can be used to assemble the L1 feed. In another embodiment, the process can be used to assemble the L2 feed. The process can provide (30) a flat flexible circuit substrate. The process can provide (32) a formed flexible circuit substrate. In a number of embodiments, the flexible circuit substrates are made of an LCP material. The process can apply (34) an adhesive to a plurality of locations on a surface of the flat substrate or the formed substrate. The process can join (36) the flat substrate and the formed substrate using the adhesive. The process then heats (38) the joined flat substrate and the formed substrate to bond the substrates.

In one embodiment, the process can perform the sequence of actions in any order. In another embodiment, the process can skip one or more of the actions. In other embodiments, one of more of the actions are performed simultaneously. In some embodiments, additional actions can be performed.

Figure 4:
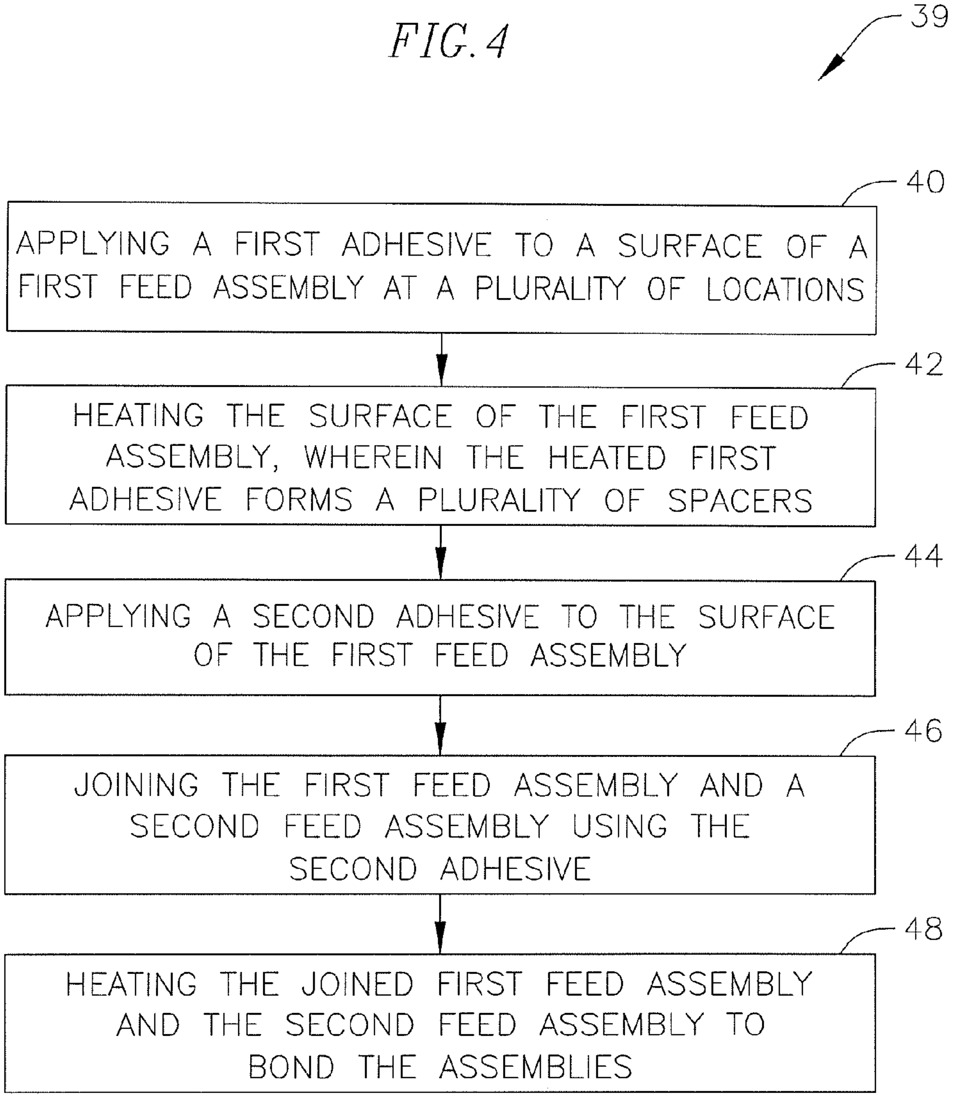
FIG. 4 is a flow chart of a process for forming a bond between two RF feed assemblies of a lightweight antenna in accordance with one embodiment of the invention.

FIG. 4 is a flow chart of a process 39 for forming a bond between two RF feed assemblies of a lightweight antenna in accordance with one embodiment of the invention. In one embodiment, the process can be used to form a bond between the L1 and L2 feeds. The process can apply (40) a first adhesive to a surface of a first feed assembly at a plurality of locations. The process can heat (42) the surface of the first feed assembly, where the heated first adhesive forms a plurality of spacers. The process can then apply (44) a second adhesive to the surface of the first feed assembly. In some embodiments, the second adhesive is applied to the spacers on the first feed assembly. The process can join (46) the first feed assembly and a second feed assembly using the second adhesive. The process can then heat (48) the joined first feed assembly and the second feed assembly to bond the assemblies.

In one embodiment, the process can perform the sequence of actions in any order. In another embodiment, the process can skip one or more of the actions. In other embodiments, one of more of the actions are performed simultaneously. In some embodiments, additional actions can be performed.

FIGS. 5*a*-5*f* illustrate an assembly process for a level one RF feed in accordance with one embodiment of the invention. Prior to the assembly process, a process for forming the components for the level one RF feed can be performed. The forming process is described in a co-pending U.S. patent application, entitled "Process for Fabricating An Origami Formed Antenna Radiating Structure", as referenced above, the entire content of which is expressly incorporated herein by reference. More specifically, the forming process provides a precisely formed flexible circuit substrate.

Figure 5A:
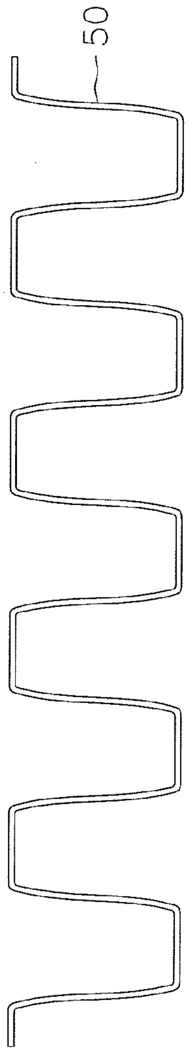
FIGS. 5*a*-5*f* illustrate an assembly process for a level one RF feed in accordance with one embodiment of the invention.

FIG. 5*a* is a side view of a precisely formed flexible circuit substrate 50 in accordance with the assembly process for a level one RF feed.

Figure 5B:
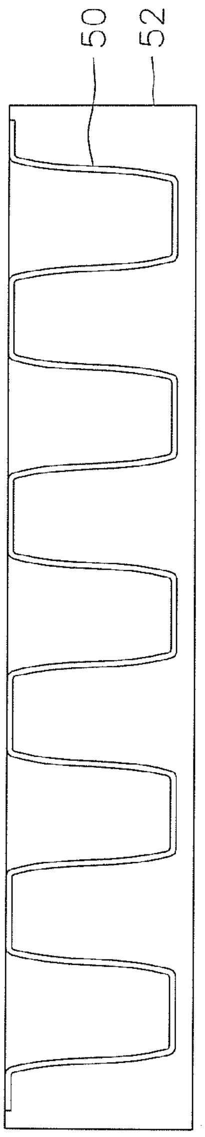

FIG. 5*b* is a side view of the precisely formed flexible circuit substrate 50 of FIG. 5*a* inserted into a jig 52. The jig 52 can hold the top areas of the formed substrate 50 flat so that the assembly process can operate thereon.

Figure 5C:
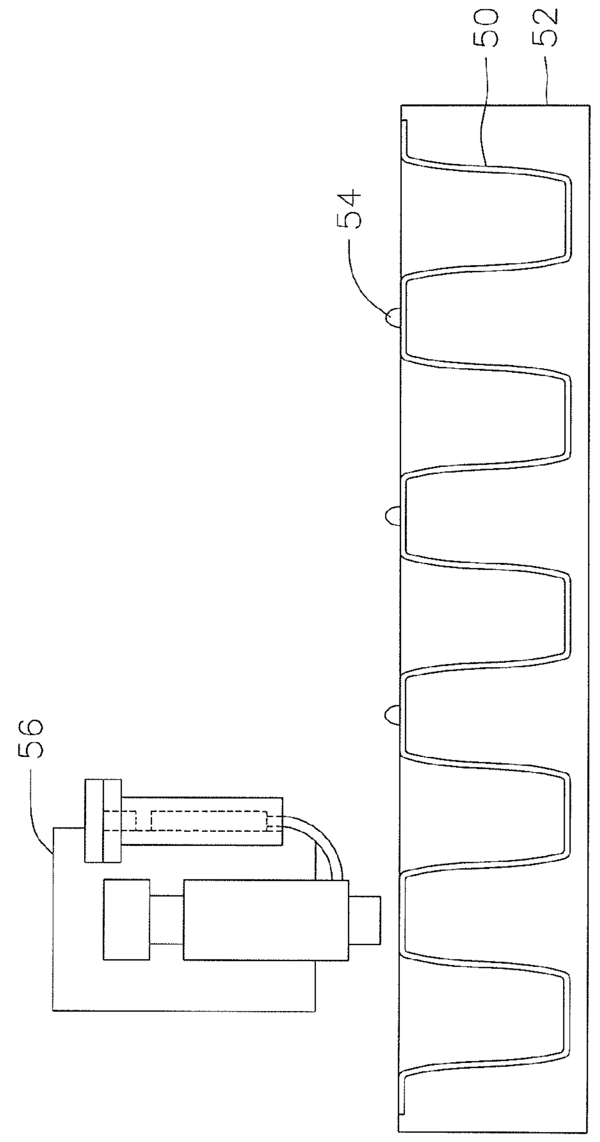

FIG. 5*c* is a side view of the precisely formed flexible circuit substrate 50 of FIG. 5*a* receiving non-conductive adhesive 54 from a dispensing machine 56. The non-conductive adhesive 54 can be dispensed along top flat portions of the formed substrate 50 to allow for future attachment. In one embodiment, the non-conductive adhesive 54 is a H70E-2 adhesive made by EPO-TEK® of Billerica, Mass.

In FIG. 5*c*, the dispensing of adhesives is accomplished with a dispensing machine 56. In other embodiments, adhesives can be dispensed using a screen printing process, a microdrop process, or other suitable methods known in the art.

Figure 5D:
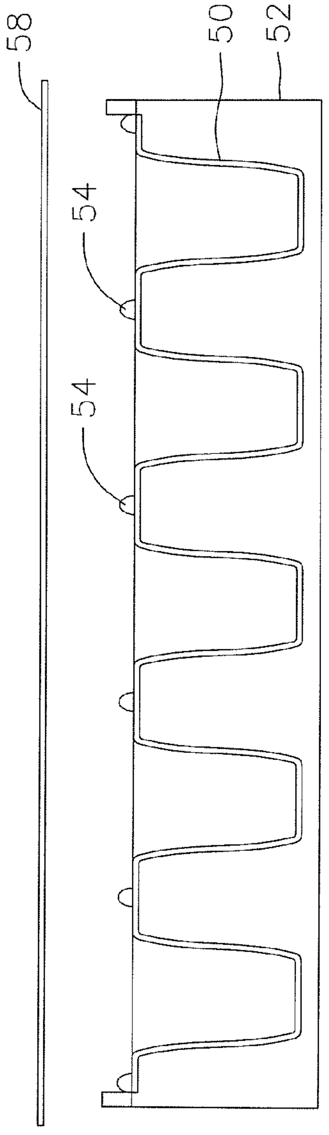

FIG. 5*d* is a side view of a flat flexible circuit substrate 58 being applied to the precisely formed flexible circuit substrate 52 of FIG. 5*a* to form a number of long slot radiators.

Figure 5E:
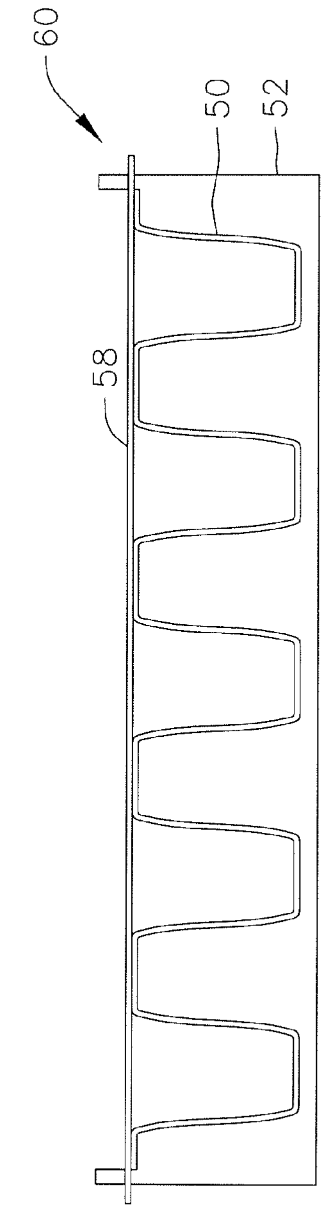

FIG. 5*e* is a side view of the L1 feed 60 of FIG. 5*d* in a curing process. In the curing process, the joined substrates can be heated in a vacuum bag or heated press at a preselected temperature for a preselected duration.

Figure 5F:
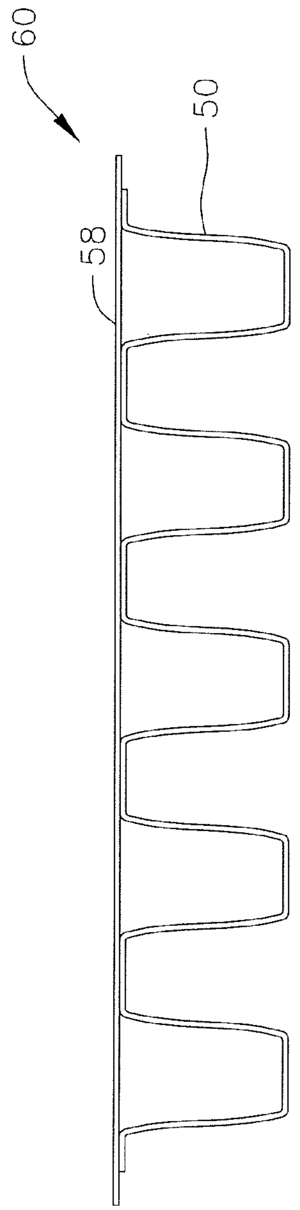

FIG. 5*f* is a side view of the completed L1 feed 60 of FIG. 5*e* after it is removed from the jig.

FIGS. 6*a*-6*g* illustrate an assembly process for a level two RF feed in accordance with one embodiment of the invention. Prior to the assembly process, a process for forming the components for the level two RF feed can be performed. The forming process is described in a co-pending U.S. patent application, entitled "Fabrication Method for Three Dimensional Molded Feed Structures",as referenced above, the entire content of which is expressly incorporated herein by reference. More specifically, the forming process provides a number of formed flexible circuit substrates to be used in assembling the level RF feed.

Figure 6A:
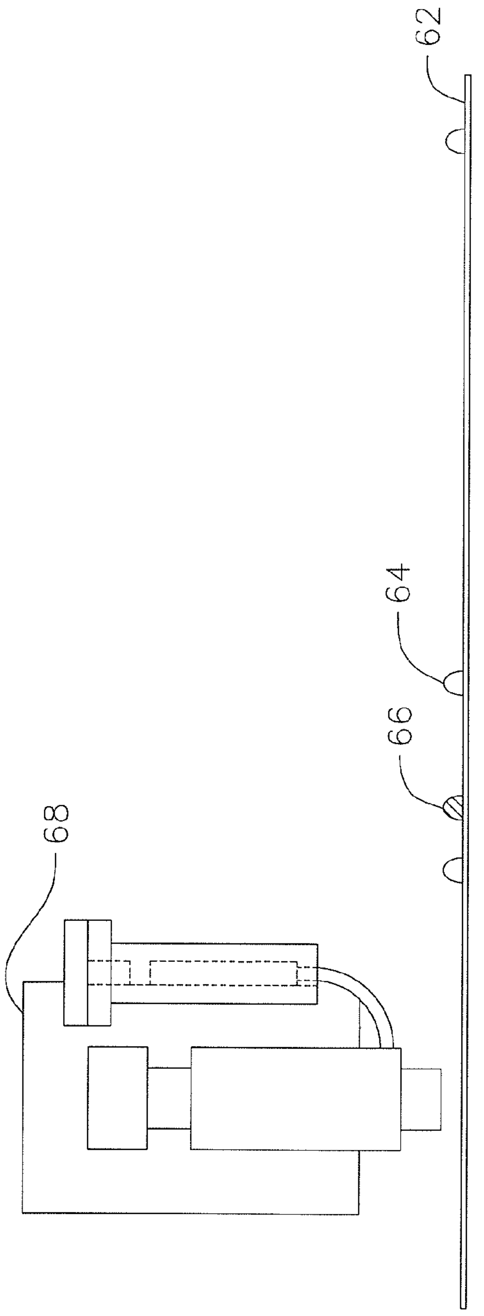
FIGS. 6*a*-6*g* illustrate an assembly process for a level two RF feed in accordance with one embodiment of the invention.

FIG. 6*a* is a side view of a flat flexible circuit substrate 62 receiving both non-conductive adhesive 64 and conductive adhesive 66 from a dispensing machine 68 in accordance with one embodiment of the invention. In one embodiment, the non-conductive adhesive 64 is a H70E-2 adhesive made by EPO-TEK® of Billerica, Mass. In some embodiments, the conductive adhesive is a ABLEBOND GA-1ELV adhesive made by Ablestik of Rancho Dominguez, Calif.

In FIG. 6*a*, the dispensing of adhesives is accomplished with a dispensing machine 68. In other embodiments, adhesives can be dispensed using a screen printing process, a microdrop process, or other suitable methods known in the art.

Figure 6B:
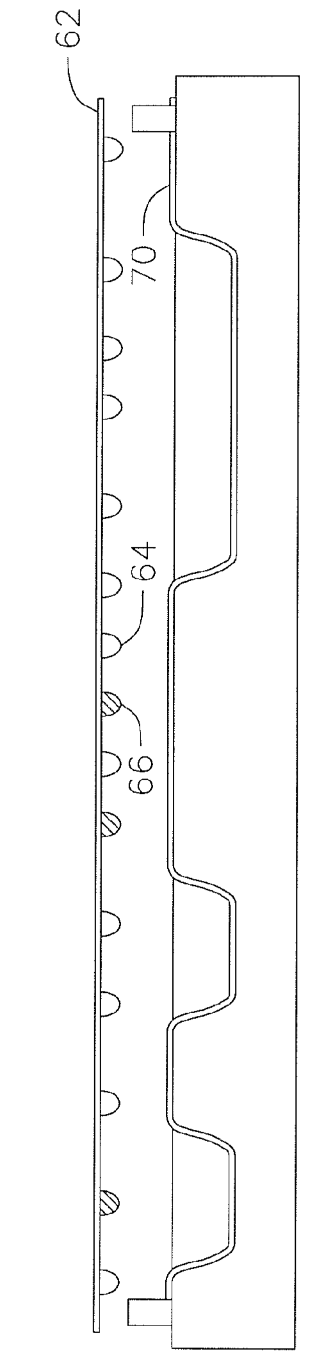

FIG. 6*b* is a side view of the flat flexible circuit substrate 62 of FIG. 6*a* flipped over for application to a formed flexible circuit substrate 70 in a mold 72 in accordance with one embodiment of the invention.

Figure 6C:
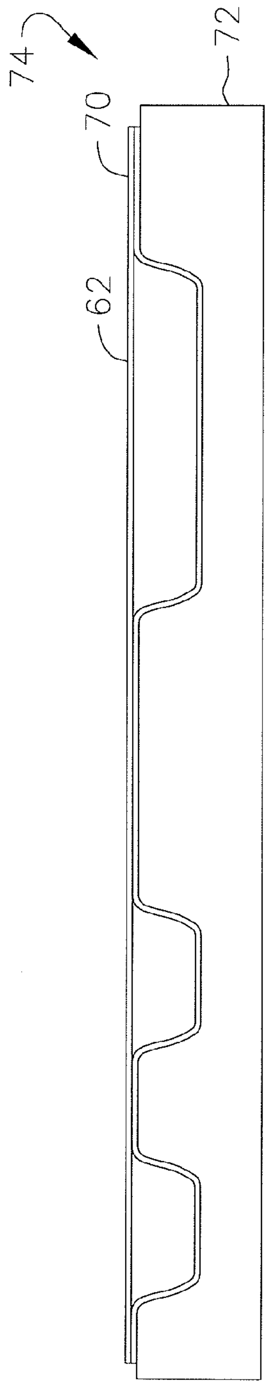

FIG. 6*c* is a side view of the flat flexible circuit substrate 62 and the formed flexible circuit substrate 70 in a curing process in accordance with one embodiment of the invention. In some embodiments, the curing process includes heating the joined substrates in a vacuum bag or heated press at a preselected temperature for a preselected duration. In one embodiment, the vacuum bag has a bleeder valve.

Figure 6D:
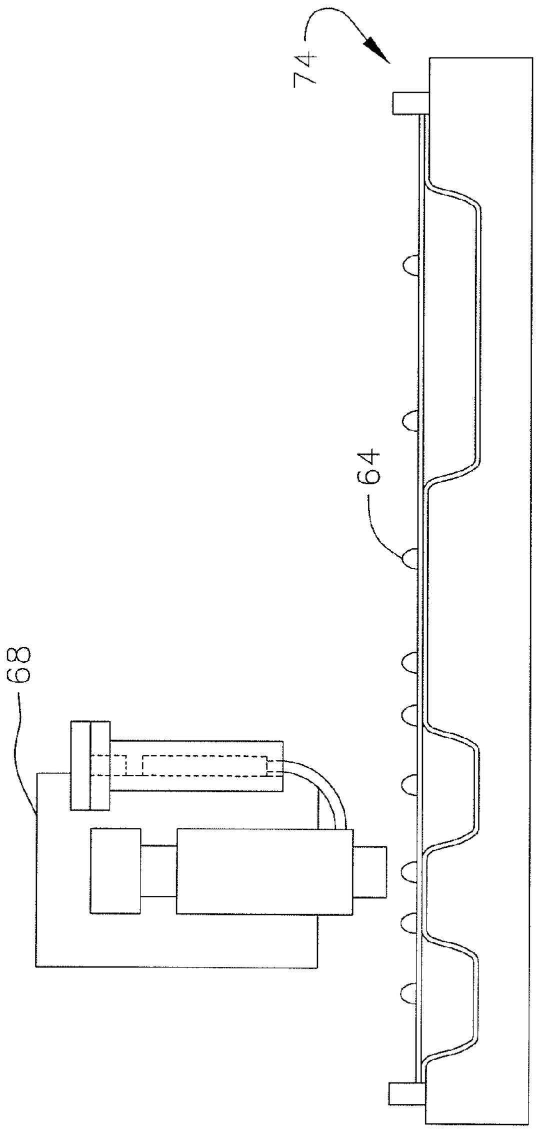

FIG. 6*d* is a side view of the assembled two layer structure 74 of FIG. 6*c* receiving additional non-conductive adhesive 64 from the dispensing machine 68.

Figure 6E:
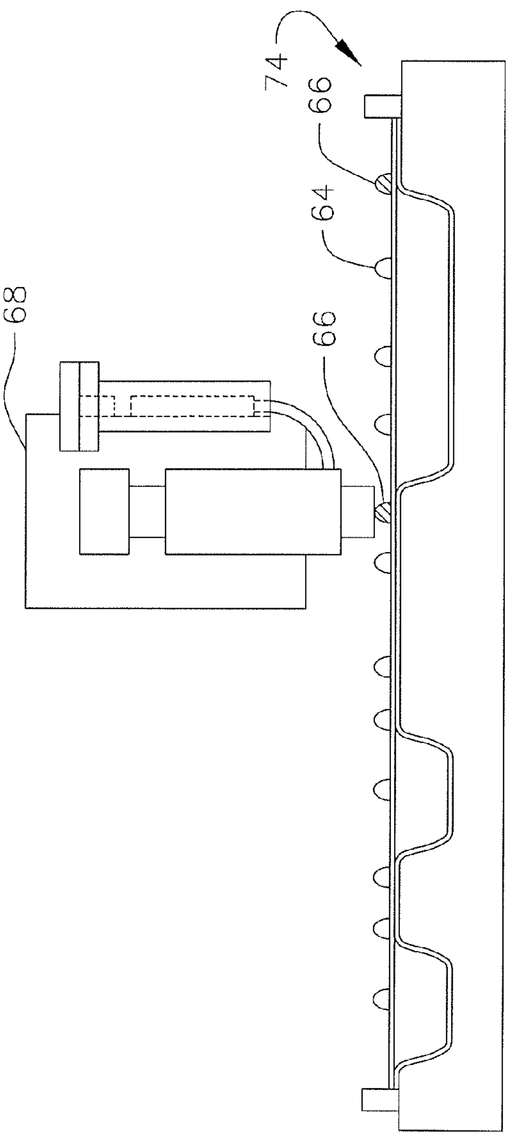

FIG. 6*e* is a side view of the assembled two layer structure 74 of FIG. 6*d* receiving additional conductive adhesive 66 from the dispensing machine 68. In a number of embodiments, the dispensing machine dispenses the conductive adhesive 66 and non-conductive adhesive 64 at preselected locations. In some embodiments, the locations are evenly spaced.

Figure 6F:
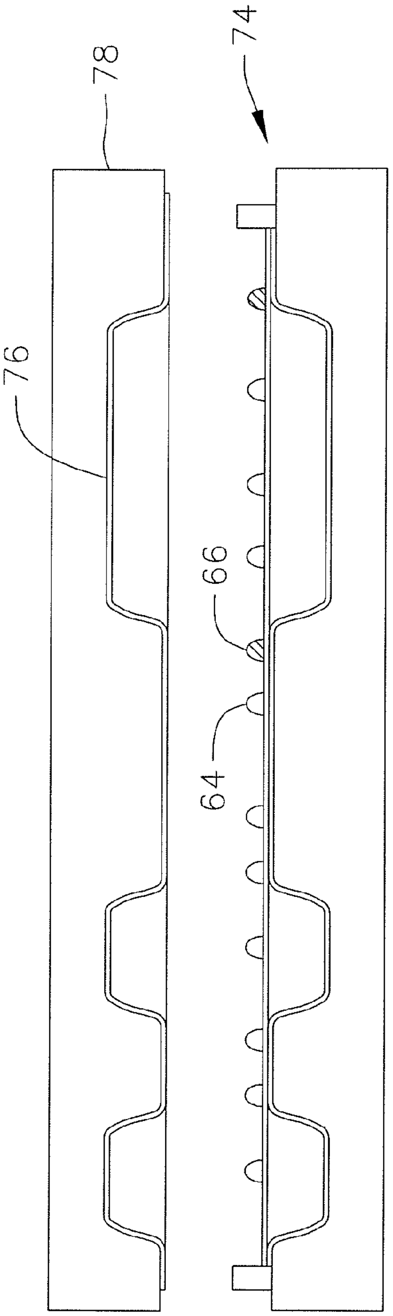

FIG. 6*f* is a side view of a second formed flexible circuit substrate 76 in a mold 78 applied to the assembled two layer structure 74 of FIG. 6*e*.

Figure 6G:
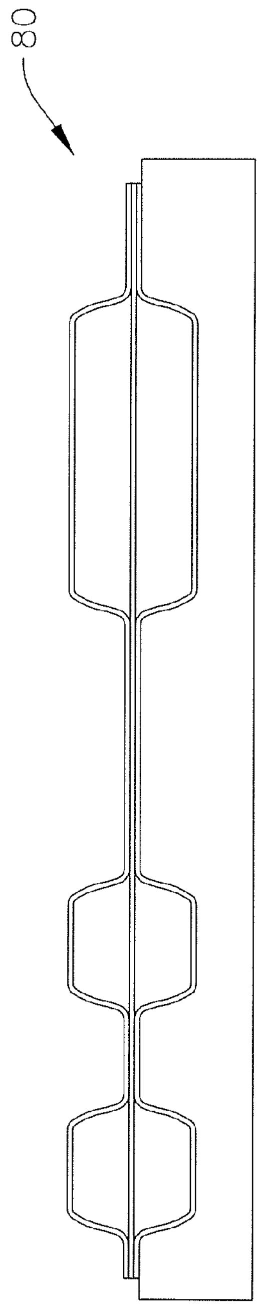

FIG. 6*g* is a side view of the second formed flexible circuit substrate and the assembled two layer structure of FIG. 6*f* in a second curing process, thereby forming a completed L2 feed assembly 80 in accordance with one embodiment of the invention. In some embodiments, the curing process includes heating the joined substrates in a vacuum bag or heated press at a preselected temperature for a preselected duration. In one embodiment, the vacuum bag has a bleeder valve.

FIGS. 7*a*-7*i* illustrate a process for assembling an antenna structure including bonding a level one RF feed and a level two RF feed in accordance with one embodiment of the invention. With the completed L1 and L2 feed assemblies from the processes described above, the antenna structure can be assembled using the process described here.

Figures 7A, 7B, 7C:
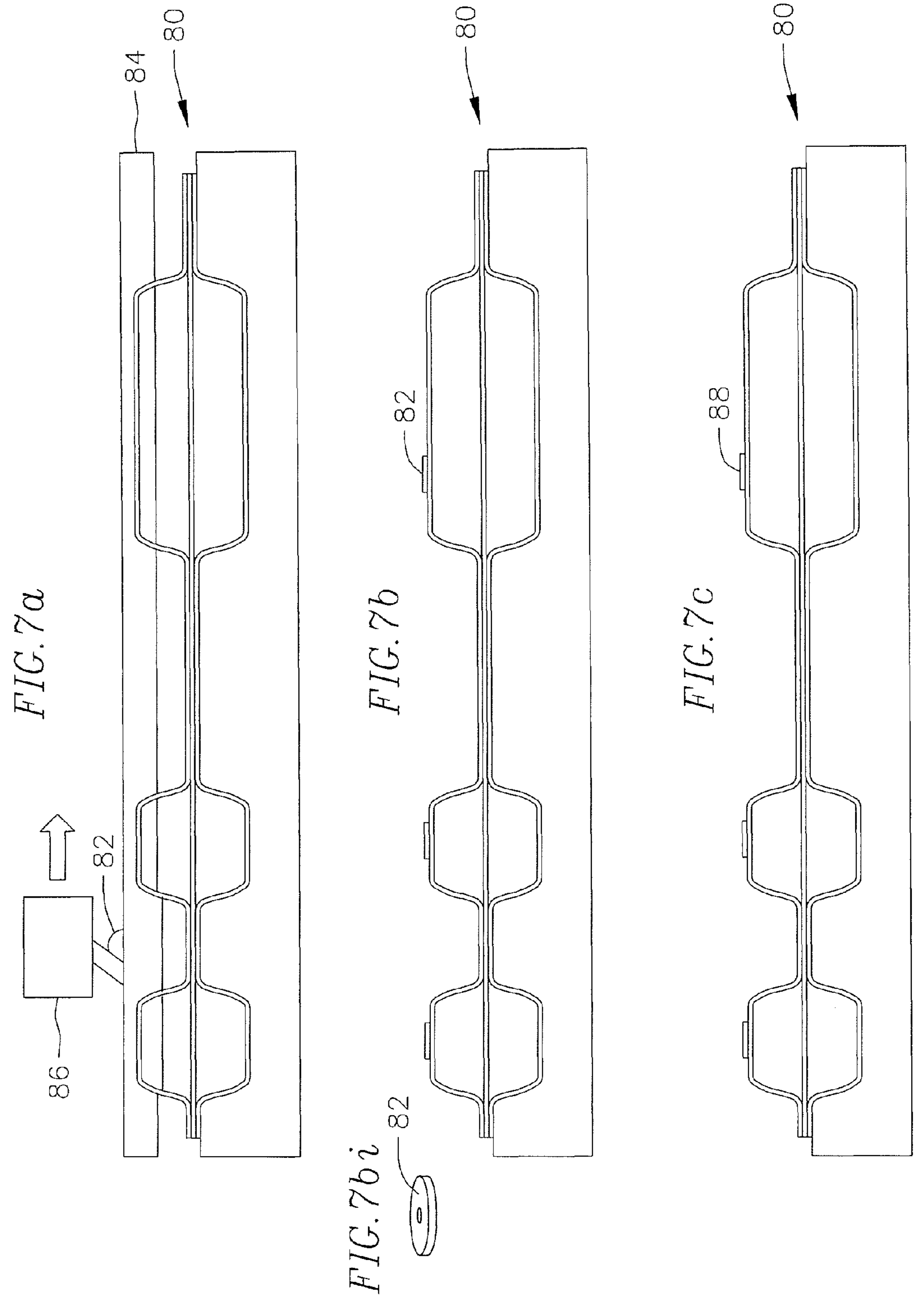
FIGS. 7*a*-7*i* illustrate a process for assembling an antenna structure including bonding a level one RF feed and a level two RF feed in accordance with one embodiment of the invention.

FIG. 7*a* is a side view of a level two (L2) RF feed 80 receiving non-conductive adhesive 82 through a screen printed pattern or stencil 84 in accordance with one embodiment of the invention. The non-conductive adhesive 82 can be applied using a dispenser machine 86 or it can be applied by hand. In several embodiments, the non-conductive adhesive 82 is a Epibond 7275 adhesive made by Huntsman Advanced Materials Americas, Inc. of Los Angeles, Calif.

FIG. 7*b* is a side view of the level two RF feed 80 of FIG. 7*a* after the screen printed pattern layer or stencil 84 has been removed leaving the Epibond adhesive 82 at preselected areas along the L2 feed.

FIG. 7*bi* is an enlarged perspective view of a washer shaped spacer 88 formed from the cured Epibond adhesive on the level two RF feed of FIG. 7*b*. In FIG. 7*bi*, the spacer takes the shape of a round washer. In other embodiments, the spacer can be a square washer or washer of another suitable shape. In one embodiment, the spacer can be formed of a ring of small adhesive balls/dots. In other embodiments, other suitable spacers that provide a controlled separation between the RF feeds can be used.

FIG. 7*c* is a side view of the level two RF feed 80 of FIG. 7*b* in a curing process, where the cured Epibond adhesive forms the spacers 88 on a top formed layer of the level two RF feed. In one embodiment, the spacers have a disc like shape with a hole in the center of the disc for making a physical and electrical interconnect between the L1 and L2 feeds. In other embodiments, the spacers can have other suitable shapes for maintaining a preselected separation between the L1 and L2 feeds.

Figure 7D:
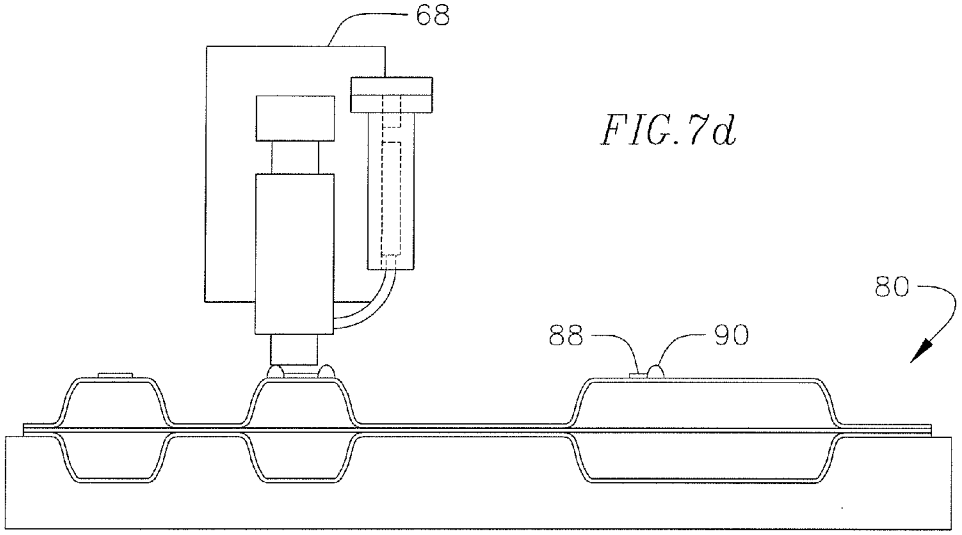

FIG. 7*d* is a side view of the level two RF feed 80 of FIG. 7*c* receiving non-conductive adhesive 90 along the top formed layer of the level two RF feed from the dispensing machine 68. In some embodiments, the non-conductive adhesive 90 is dispensed on the spacers 88.

Figure 7E:
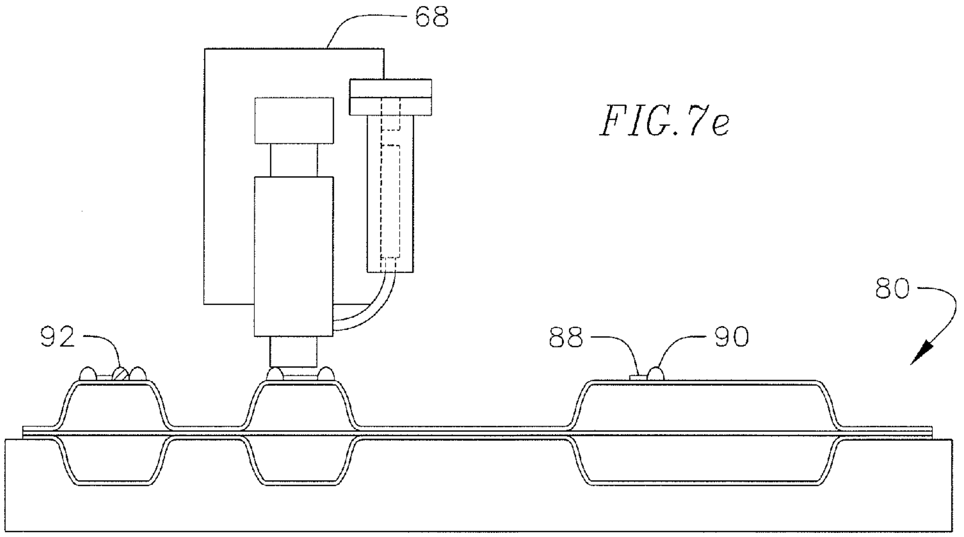

FIG. 7*e* is a side view of the level two RF feed 80 of FIG. 7*d* receiving conductive adhesive 92 along the top formed layer of the level two RF feed from the dispensing machine 68. In some embodiments, the conductive adhesive 92 is dispensed on the spacers 88 or into a hole disposed at the center of the spacers 88 (see FIG. 7*bi*). In a number of embodiments, the conductive and/or non-conductive adhesives are epoxies. In other embodiments, the conductive and/or non-conductive adhesives can be solder balls and/or conductive spheres.

Figure 7F:
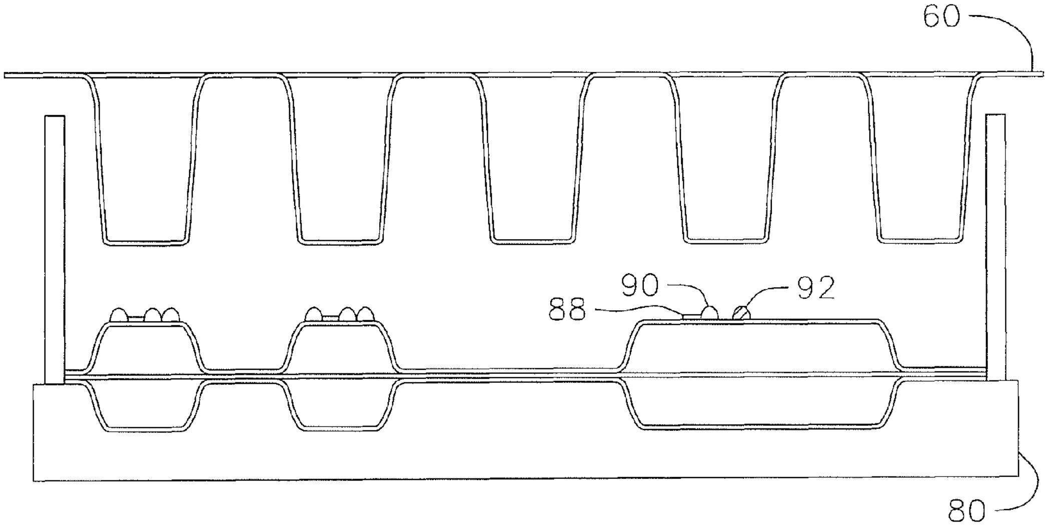

FIG. 7*f* is a side view of a level one RF feed 60 being aligned with the level two RF feed 80 of FIG. 7*e* and the spacers 88 in preparation for bonding.

Figure 7G:
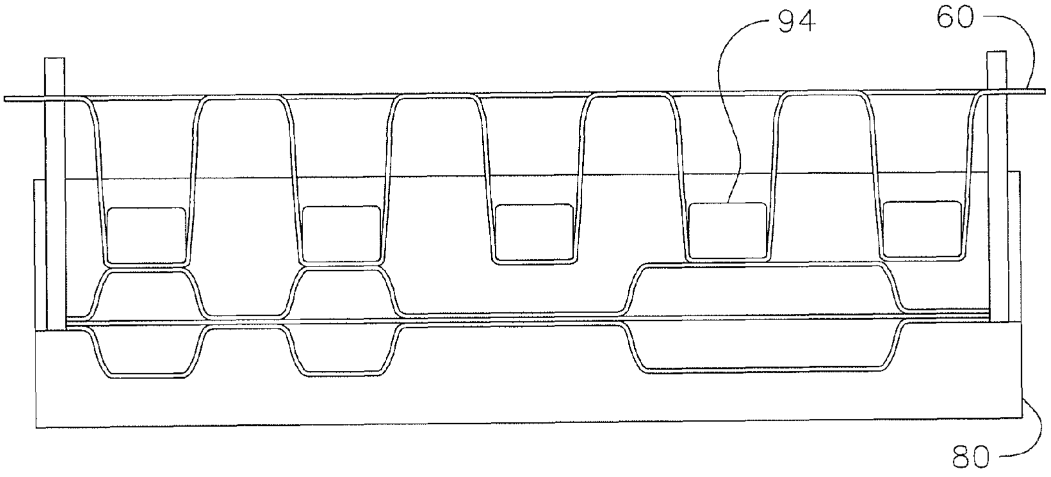

FIG. 7*g* is a side view of the level one RF feed 60 of FIG. 7*f* bonded with the level two RF feed 80 of FIG. 7*f* using pressure applied by multiple bars 94 placed within the long slot radiators of the level one RF feed 60.

Figure 7H:
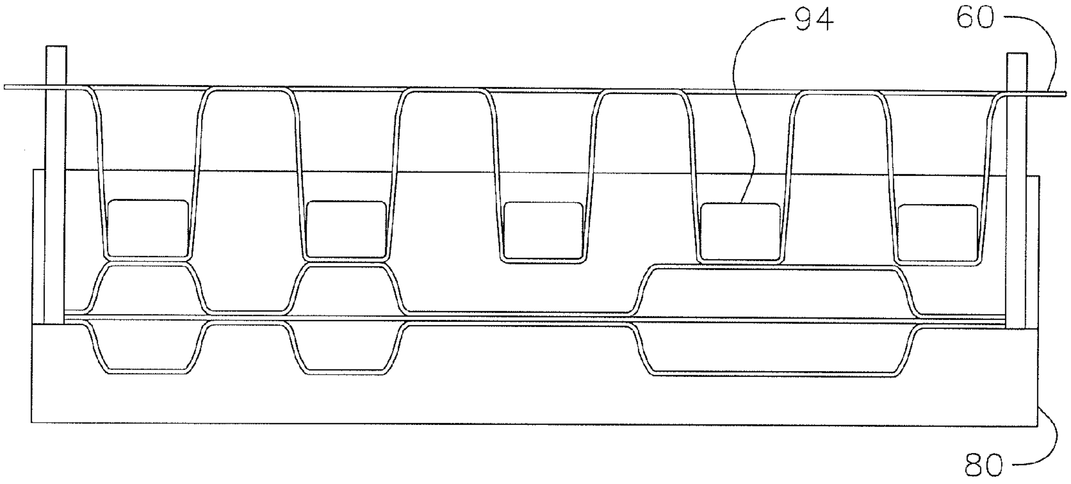

FIG. 7*h* is a side view of the bonded level one RF feed 60 and level two RF feed 80 of FIG. 7*g* in a curing process. In some embodiments, the curing process includes heating the joined substrates in a vacuum bag or heated press at a preselected temperature for a preselected duration. In one embodiment, the vacuum bag has a bleeder valve.

Figure 7I:
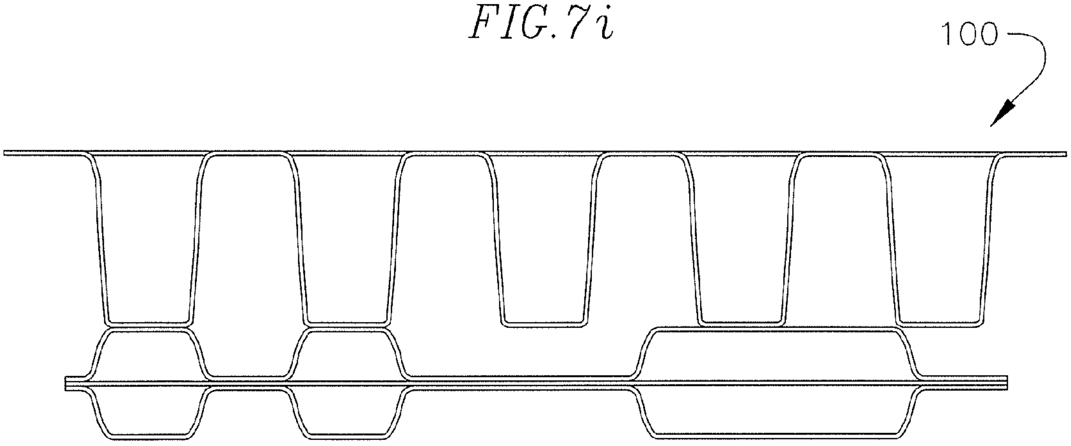

FIG. 7*i* is a side view of the completed RF antenna structure 100 in accordance with one embodiment of the invention.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A process for forming a lightweight antenna including a process for forming a first feed assembly for the antenna, the process for forming the first feed assembly comprising:
- providing a flat flexible circuit substrate;
- providing a formed flexible circuit substrate;
- applying a plurality of non-conductive adhesive drops to a plurality of locations on a surface of the flat substrate or the formed substrate;
- joining the flat substrate and the formed substrate using the adhesive drops; and
- heating the joined flat substrate and the formed substrate to bond the substrates.

2. The process of claim 1, wherein the process for forming the first feed assembly further comprises:
- applying a plurality of second adhesive drops to a plurality of second locations on the surface, wherein each of the second adhesive drops is a conductive adhesive.

3. The process of claim 1, wherein the applying the plurality of adhesive drops to the surface of the flat substrate or the formed substrate comprises applying the plurality of adhesive drops to the surface of the formed substrate.

4. The process of claim 1, wherein the applying the plurality of adhesive drops to the surface of the flat substrate or the formed substrate comprises applying the plurality of adhesive drops to the surface of the flat substrate.

5. The process of claim 4, wherein the process for forming the first feed assembly further comprises:
- applying a plurality of second adhesive drops to a second surface of the flat substrate, wherein the second surface is opposite to the surface;
- providing a second formed flexible circuit substrate;
- joining the flat substrate and the second formed substrate using the second adhesive drops; and
- heating the joined flat substrate, the formed substrate, and second formed substrate to bond the substrates.

6. The process of claim 5, wherein the process for forming the first feed assembly further comprises:
- applying a plurality of third adhesive drops to the second surface, wherein each of the third adhesive drops is a conductive adhesive;
- wherein each of the second adhesive drops is a non-conductive adhesive.

7. The process of claim 5, further comprising a process for forming a second feed assembly for the antenna, the process for forming the second feed assembly comprising:
- providing a second flat flexible circuit substrate;
- providing a third formed flexible circuit substrate;
- applying a plurality of third adhesive drops to a surface of the second flat substrate or the third formed substrate;
- joining the second flat substrate and the third formed substrate using the third adhesive drops;
- heating the joined second flat substrate and the third formed substrate to bond the substrates.

8. The process of claim 7, further comprising:
- applying a plurality of fourth adhesive drops to a surface of the first feed assembly or the second feed assembly;

- heating the surface of the first feed assembly or the second feed assembly, wherein the heated fourth adhesive drops form a plurality of spacers.

9. The process of claim 8, further comprising:
- applying a plurality of fifth adhesive drops to the spacers;
- joining the first feed assembly and the second feed assembly using the fifth adhesive drops;
- heating the joined first feed assembly and the second feed assembly to bond the assemblies.

10. The process of claim 9, further comprising:
- applying a plurality of sixth adhesive drops to the spacers, wherein each of the sixth adhesive drops is a conductive adhesive;
- wherein each of the fifth adhesive drops is a non-conductive adhesive.

11. The process of claim 1, wherein the formed flexible substrate comprises a plurality of parallel channels extending in a first direction.

12. The process of claim 1, wherein the flat substrate and the formed substrate comprise a liquid crystal polymer (LCP) material.

13. The process of claim 12, wherein the wherein the flat substrate and the formed substrate comprise copper cladding on at least one surface of the substrates.

14. The process of claim 1, wherein the plurality of locations are evenly spaced along the surface of the flat substrate or the formed substrate.

15. The process of claim 1, wherein the heating the joined flat substrate and the formed substrate to bond the substrates comprises heating the joined substrates in a vacuum bag or heated press.

16. A process for forming a bond between feeds of a lightweight antenna, the process comprising:
- applying a plurality of non-conductive first adhesive drops to a surface of a first feed assembly at a plurality of locations;
- heating the surface of the first feed assembly, wherein the heated first adhesive drops form a plurality of spacers;
- applying a plurality of second adhesive drops to the surface of the first feed assembly;
- joining the first feed assembly and a second feed assembly using the second adhesive drops; and
- heating the joined first feed assembly and the second feed assembly to bond the assemblies.

17. The process of claim 16, further comprising:
- applying a plurality of third adhesive drops to the surface of the first feed assembly, wherein each of the third adhesive drops is conductive;
- wherein each of the second adhesive drops is non-conductive.

18. The process of claim 16, wherein the applying the first adhesive drops to the surface of the first feed assembly at the plurality of locations comprises applying the first adhesive drops to the surface of the first feed assembly at the plurality of locations using a stencil.

19. The process of claim 16, wherein the first adhesive comprises an Epibond 7275 non-conductive adhesive.

20. The process of claim 16, wherein the first feed assembly comprises:
- a top formed flexible circuit substrate;
- a middle flat flexible circuit substrate; and
- a bottom formed flexible circuit substrate;
- wherein the top substrate and bottom substrate are bonded to the middle substrate at a plurality of locations along the middle substrate.

21. The process of claim 16:

wherein the second feed assembly comprises a plurality of elongated parallel channels extending in a first direction;

further comprising installing at least one elongated bar into the plurality of channels, the bars configured to provide pressure for joining and bonding the first feed assembly and the second feed assembly.

22. The process of claim 16, wherein the applying the second adhesive drops to the surface of the first feed assembly comprises applying the second adhesive drops to the spacers.

23. The process of claim 1, wherein the applying the plurality of adhesive drops to the plurality of locations on the surface of the flat substrate or the formed substrate comprises applying the plurality of adhesive drops to the plurality of locations on the surface of the flat substrate or the formed substrate using a dispensing machine.

24. The process of claim 16:

wherein the applying the plurality of first adhesive drops to the surface of the first feed assembly at the plurality of locations comprises applying the plurality of first adhesive drops to the surface of the first feed assembly at the plurality of locations using a dispensing machine;

wherein the applying the plurality of second adhesive drops to the surface of the first feed assembly comprises applying the plurality of second adhesive drops to the surface of the first feed assembly using the dispensing machine.

* * * * *